Feb. 24, 1970   A. O. DU BOIS   3,497,602
APPARATUS FOR PRODUCING AND DIRECTING AN ELECTRON
BEAM IN AN ELECTRON BEAM FURNACE
Filed May 3, 1967                           2 Sheets-Sheet 1

INVENTOR.
ANDREW O. DuBOIS
BY
ATTORNEYS

Feb. 24, 1970 A. O. DU BOIS 3,497,602
APPARATUS FOR PRODUCING AND DIRECTING AN ELECTRON
BEAM IN AN ELECTRON BEAM FURNACE
Filed May 3, 1967 2 Sheets-Sheet 2

INVENTOR.
ANDREW O. DuBOIS
BY
Anderson, Luedeka, Fitch, Even &
Tabin
ATTORNEYS

United States Patent Office 3,497,602
Patented Feb. 24, 1970

3,497,602
APPARATUS FOR PRODUCING AND DIRECTING AN ELECTRON BEAM IN AN ELECTRON BEAM FURNACE
Andrew Oakley DuBois, Palo Alto, Calif., assignor, by mesne assignments, to Air Reduction Company, Incorporated, a corporation of New York
Filed May 3, 1967, Ser. No. 635,823
Int. Cl. H05b 7/18
U.S. Cl. 13—31                     6 Claims

ABSTRACT OF THE DISCLOSURE

Apparatus for producing and directing an electron beam wherein a ribbon shaped electron beam is deflected through an arcuate path lying generally in the plane of the ribbon shaped beam by means of a magnetic field extending transversely to the initial path and generally perpendicular to the ribbon shaped electron beam.

This invention relates to electron beam apparatus and, more particularly, to improved apparatus for producing an electron beam and directing it through a curved path, the apparatus being particularly suited for use in an electron beam furnace system.

Electron beam furnace systems utilize one or more electron beam sources or guns for producing high energy electron beams, and further utilize means for directing such beams to a target to be heated. It has been found that the use of transverse magnetic fields (that is, those fields which have lines of flux extending transversely of the beam path) for deflecting the beam through a curved path permits the electron emitter to be placed in a location where it is less likely to be damaged by direct condensation of vapor or by ion bombardment.

The use of elongated emitters, for example, a thin tungsten wire several inches long, permits a large emission current to be drawn from a single electron beam source or gun at moderate accelerating voltages. The use of elongated emitters, which produce a ribbon type electron beam, that is, a beam having an extremely elongated cross section, requires deflecting and focusing fields capable of handling a beam of this type.

Heretofore, apparatus for producing and directing ribbon shaped electron beams has frequently required very large poles of complex shape for establishing uniform and strong deflecting and focusing fields.

It is an object of this invention to provide improved apparatus for producing and directing an electron beam.

Another object of the invention is to provide apparatus for producing and directing a ribbon shaped electron beam and in which the size of the poles for establishing the deflecting magnetic field is minimized.

It is another object of the invention to provide apparatus for producing and directing an electron beam in which superior control over the electron beam is afforded with a minimum of required space.

A further object of the invention is to provide apparatus for producing and deflecting a ribbon shaped electron beam and for focusing the beam to have a generally round cross section.

Other objects of the invention will become apparent to those skilled in the art from the following description taken in connection with the accompanying drawings wherein.

Very generally, the invention includes means 11 for producing a ribbon shaped electron beam directed in an initial path. A magnetic field is established transverse to the initial path and generally perpendicular to the ribbon shaped electron beam by means 12. The ribbon shaped electron beam is deflected by such field through a curving path lying generally in the plane of the ribbon shaped beam.

Figure 1:
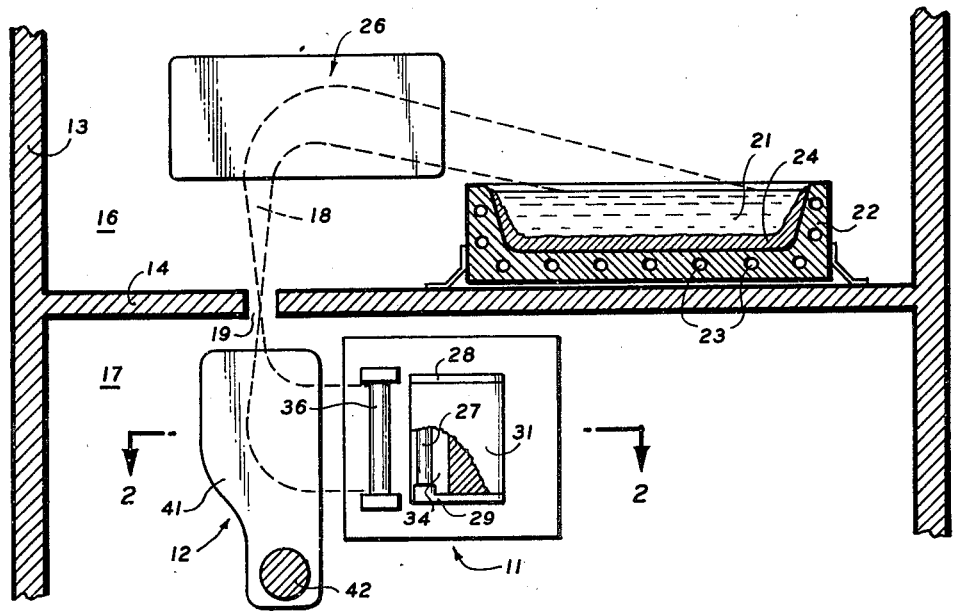
FIGURE 1 is schematic sectional view illustrating parts of an electron beam furnace system utilizing the invention.

Referring now in greater detail to FIGURE 1, an electron beam furnace system in which the invention is used is shown schematically. The system includes a vacuum enclosure having an outer wall 13, parts of which are illustrated. The enclosure is divided by a transverse wall 14 into an upper chamber 16 and a lower chamber 17. Suitable vacuum pumps (not shown) may be provided for each of the two chambers. When evaporation is taking place in the chamber 16, separate evacuation of the chamber 17 helps to minimize the amount of vapor therein.

An electron beam gun 11 is positioned in the low vapor environment of the chamber 17. The substantial absence of vapor in the chamber 17 facilitates the operation of the electron beam gun. The electron beam gun will be described in greater detail subsequently, and produces an electron beam 18 having a ribbon shape (that is, of elongated or ideally rectangular cross section), the extreme edges of which are indicated by the dash-dot lines. The beam 18 is passed through an opening 19 in the transverse wall 14 into the upper chamber 16.

The beam 18 is deflected through about 115° in the upper chamber 16 to impinge upon and melt the target material 21 held in a crucible 22. The particular illustrated furnace system is for evaporating the target material, however, the invention is applicable to heating for other purposes as well. The crucible 22 is provided with coolant passages 23 through which a coolant is circulated for cooling the crucible. A skull 24 of the target material, in solid form, forms between the molten target material and the crucible walls. The material in the crucible may be replenished, either continuously or periodically, by suitable stock material feed, not illustrated.

Deflection of the electron beam 18 in the chamber 16 is accomplished by a deflection and focusing system 26. This system may be of any suitable type, such as for example, a system generally in accordance with the teachings of copending application Ser. No. 464,968, assigned to the assignee of the present invention.

The particular electron beam furnace system shown in FIGURE 1 is for purposes of illustration only and the invention, which will be described in detail subsequently, is not limited to use in such a system. The invention is, however, of particular advantage in such a system since it is possible to achieve a very small beam cross section at the opening 19, thereby minimizing the size of the opening required. By minimizing the size of the opening, fewer vapor particles will enter the lower chamber 17 from the upper chamber 16.

Figure 2:
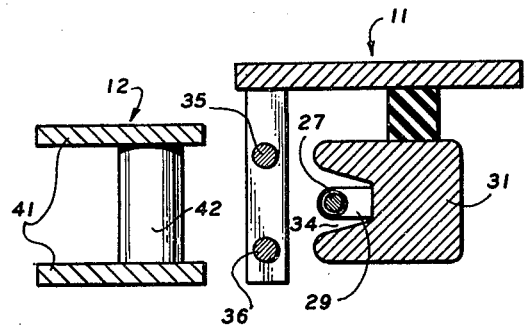
FIGURE 2 is a sectional view taken along the line 2—2 of FIGURE 1.

Referring now to FIGURE 2, the apparatus of the invention may be seen in greater detail. The electron beam gun 11 includes an elongated emitter 27 for producing electrons. The emitter 27 is preferably a tungsten wire and extends between two supporting electrodes 28 and 29. Means, not illustrated, provide a direct current potential across the electrodes 28 and 29, resulting in a flow of direct current through the emitter. The current flow raises the temperature of the emitter causing it to produce free electrons.

The free electrons produced by the emitter 27 are shaped and directed into a beam by a shaping electrode 31. The shaping electrode 31 is formed with an elongated recess 34 through which the emitter 27 extends. The shaping electrode 31 is therefore on either side of and in back of the emitter 27. A pair of parallel accelerating electrodes 35 and 36 are positioned parallel with the emitter. When the shaping electrode is maintained at a negative potential, and when the accelerating electrodes are maintained at a relatively positive potential, by suitable connections not illustrated, the electrons produced by the emitter 27 are directed out of the open end of the recess 34 away from the shaping electrode 31 and between the electrodes 35 and 36. The result is a ribbon shaped electron beam, that is, an electron beam having an elongated cross section which is ideally a narrow rectangle, but which actually approximates a narrow oval. The beam has a major axis plane which extends through the emitter.

After emerging from the gun 11, the deflecting and focusing means 12 deflect the beam through a curving path a total of about 90° while at the same time causing convergence of the beam in its major axis plane. The deflecting means 12 comprise a pair of flat pole pieces or plates 41 connected by an electromagnet 42. Suitable electrical means, not illustrated, are connected to the electromagnet 42 to cause the electromagnet to produce a magnetic field across the gap between the pole pieces 41 and in a direction such as to cause an upward deflection of the beam. In FIGURE 2 the direction of the field is from the lower pole piece toward the upper pole piece. The field established between the pole pieces or plates 41 is generally uniform and the lines of flux thereof extend generally perpendicular to the major axis plane of the ribbon shaped electron beam. The deflection produced by the field is, accordingly, a curving path lying generally in the plane of the ribbon shaped beam.

Because the emitter 27 is generally parallel with the pole pieces 41, it is possible to make the gap between the pole pieces relatively small. As a result, it is easier to achieve a desired distribution of flux compared with pole pieces of wider separation, and easier to control the magnetic field shape as desired for focusing, explained subsequently. Moreover, the extent of the fringe effect outside of the area directly between the pole pieces is more easily regulated, and the apparatus is physically more compact.

In addition to causing deflection of the electron beam through approximately 90°, the limits of the field established between the pole pieces 41 are such that the electrons toward the outer edge of the ribbon shaped electron beam are in the field longer than those electrons toward the inner edge of the ribbon shaped beam. As a result, the electrons toward the outer edge of the beam undergo a greater amount of total deflection than those electrons toward the inner edge of the beam, causing the electrons in the beam to converge in the major axis plane of the beam. By appropriately positioning the limits of the magnetic field, the beam may be focused and its cross sectional dimension thereby changed from an elongated oval into a generally round spot. The precise amount of focusing may be achieved by selecting a desired strength of the magnetic field, a particular shape of the pole pieces, and a particular orientation of the emitter with respect to the field. The length of electron travel in the field is selected to produce the desired deflection. The desired deflection may be 90°, as illustrated, or may be greater or less depending on the particular needs in the furnace configuration. Some nonuniformity in pole piece spacing may be utilized to produce a nonuniform field strength for particular deflection or focusing characteristics.

Because the pole pieces are spaced closer together, and because deflection and focusing are accomplished in the major axis plane of the ribbon beam, that is, a plane extending through the emitter parallel with the pole pieces and generally perpendicular to the flux lines of the magnetic field, the desired field configuration and deflection characteristics are more readily attained than in the case with pole pieces more widely separated and with the emitter and consequently the plane of the electron beam generally perpendicular with the pole pieces.

Figure 4:
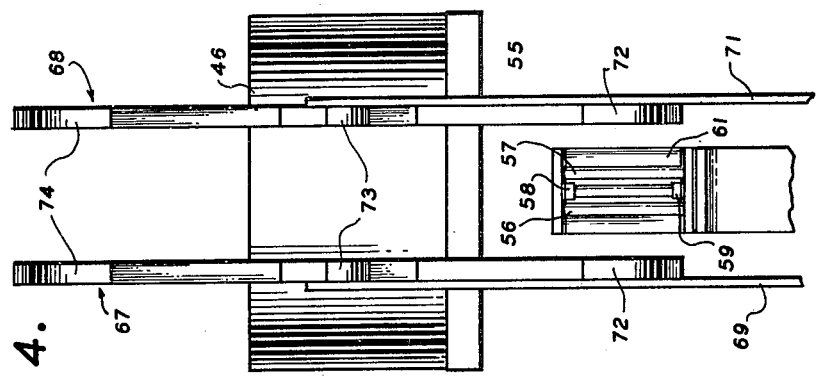
FIGURE 4 is an end view of the apparatus of FIGURE 3.
Figure 3:
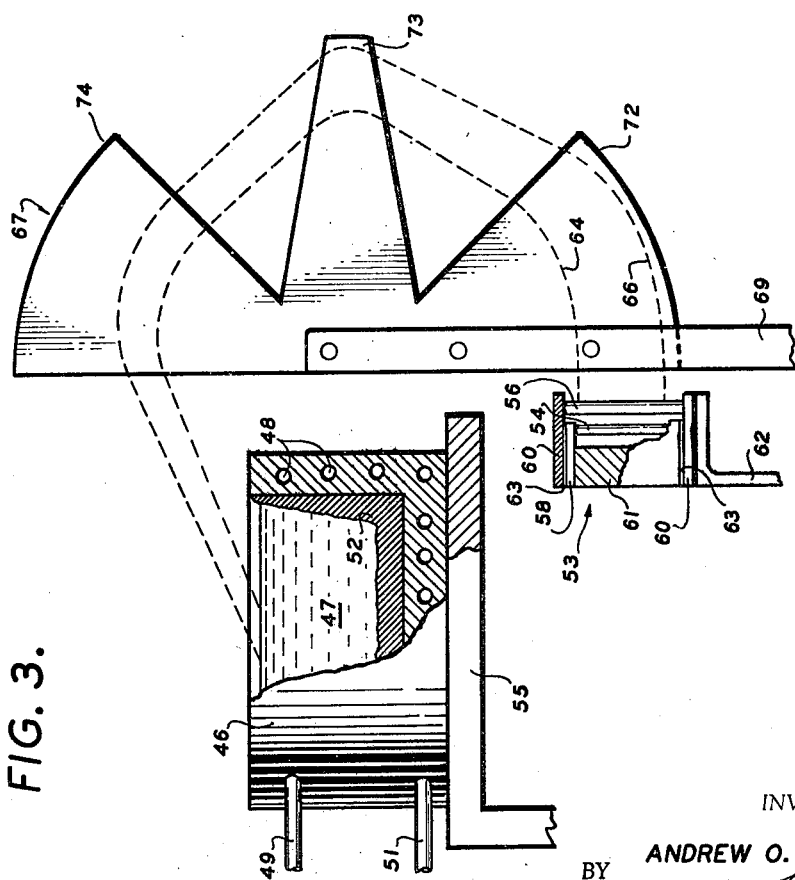
FIGURE 3 is a side elevational view, with parts broken away, illustrating a further embodiment of the invention.

Referring now to FIGURES 3 and 4, a further embodiment of the invention is shown. A crucible 46 containing molten material 47 is provided with coolant passages 48. Coolant is circulated through the passages from inlet and outlet tubes 49 and 51, respectively, and a skull 52 forms between the molten material and the wall of the crucible. The crucible is supported on a support plate 55 which is suitably mounted within an evacuated chamber in a vacuum enclosure, not illustrated.

The electron beam which is utilized to heat the molten material 47 is produced by an electron beam gun 53. The gun 53 includes an elongated emitter 54, and a pair of accelerating electrodes 56 and 57, the latter being mounted on a pair of supports 60. The emitter extends between two supporting electrodes 58 and 59 and is disposed in a recess in a shaping electrode 61. The emitter is heated by a DC current passed therethrough and electrons are produced and directed into a ribbon shaped beam in a manner similar to the operation of the electron beam gun 11 in FIGURES 1 and 2. The electron beam gun 53 is supported on a support bracket 62 suitably mounted by means not shown within the unillustrated vacuum enclosure, and insulating strips or shims 63 insulate the supports 60 from the supporting electrodes 58 and 59 and the shaping electrode 61. The respective opposite edges of the ribbon shaped electron beam are indicated by the dash-dot lines 64 and 66.

The beam is deflected and focused by a transverse magnetic field established between a pair of pole pieces or plates 67 and 68. The pole plates are supported parallel with each other and the emitter 54 on brackets 69 and 71, suitably secured in the unillustrated vacuum enclosure. The plates are generally semicircular in shape but have substantial pie-shaped wedges cut therein, two wedges in each plate. As a result, three separate pairs 72, 73 and 74 of plate segments establish three transverse fields generally perpendicular to the plane of the ribbon beam.

The beam is deflected as indicated in FIGURE 3 through approximately 270°. In the first field the beam passes through, established by the plate segment pair 72, the plate segments are of a configuration that causes the field to be shaped so the outer edge of the beam has a longer path length in the field than the inner edge. A slight convergence results. In the next field, between the plate segment pair 73, the opposite edges of the beam diverge slightly due to the relatively shorter path length of electrons toward the outer edge of the beam. The last magnetic field between the segment pair 74 is shaped in a manner similar to the first field such that the beam is convergent, causing the beam to focus at the surface of the molten material 47.

Because the pole plates 67 and 68 are positioned generally parallel with the elongated emitter 54, it is possible to position the pole plates relatively close to each other to thereby more easily establish desired field configurations between the respective segments of the pole plates. Such a construction is also compact. The desired deflection and control over the electron beam is much more readily attained, as has been mentioned before, where the flux lines of the magnetic field extend generally perpendicular to the axis plane of the ribbon shaped electron beam.

It may therefore be seen that the invention provides improved apparatus for producing and directing an electron beam. Superior control over the electron beam is afforded and focusing of the electron beam in a desired manner is readily achieved.

Various modifications of the invention in addition to those shown and described herein will become apparent

What is claimed is:

1. Apparatus for producing and directing a beam of electrons comprising an electron gun including an electron emitter and an accelerating electrode for generating an elongated ribbon shaped beam of electrons moving substantially in a plane, a magnetic field generator for generating magnetic lines of flux in space, and means mounting said magnetic field generator in spaced relation to said electron gun, said magnetic field generator directing said lines of flux to intersect the path of said beam of electrons generally normally of the plane thereof to deflect the electrons of said beam in the plane of the beam, the distribution of said flux focusing the beam at a predetermined location into a cross section narrow relative to the original width of the beam.

2. Apparatus according to claim 1 wherein said magnetic field generator includes a magnet and a pair of pole pieces magnetically coupled to said magnet, said pole pieces being mounted on opposite sides of the path of said beam of electrons and generally parallel to the plane thereof.

3. Apparatus according to claim 2 wherein the pole pieces are mounted in spaced relation to said electron gun downstream thereof.

4. Apparatus according to claim 1 wherein said electron emitter is an elongated linear emitter.

5. Apparatus according to claim 1 wherein said magnetic field generator comprises a plurality of pairs of pole means for generating respective transverse magnetic fields disposed successively along the path of said beam of electrons.

6. Apparatus according to claim 1 wherein said flux is distributed to provide a longer path through said flux to said predetermined location for electrons on one edge of said beam that for electrons on the other edge of said beam.

References Cited

UNITED STATES PATENTS

| | | |
|---|---|---|
| 3,132,198 | 5/1964 | Dubois et al. |
| 3,371,185 | 2/1968 | Anderson. |
| 3,303,320 | 2/1967 | Muller. |

BERNARD A. GILHEANY, Primary Examiner

H. B. GILSON, Assistant Examiner

U.S. Cl. X.R.

219—121